United States Patent [19]

Gerdes et al.

[11] 4,227,610

[45] Oct. 14, 1980

[54] CURVED BELT CONVEYOR

[75] Inventors: Heinz Gerdes, Hamburg; Karl-Günther Blättermann, Hamburg-Rahlstedt, both of Fed. Rep. of Germany

[73] Assignee: Conrad Scholtz AG, Hamburg, Fed. Rep. of Germany

[21] Appl. No.: 908,096

[22] Filed: May 22, 1978

[51] Int. Cl.³ .................. B65G 15/02; B65G 15/60
[52] U.S. Cl. ............................... 198/831; 198/840; 474/172
[58] Field of Search .............. 198/831, 840; 74/240, 74/241

[56] References Cited
U.S. PATENT DOCUMENTS

| 1,821,664 | 9/1931 | Peiler | 74/240 |
| 2,294,962 | 8/1942 | Cassell | 198/840 |
| 3,237,754 | 3/1966 | Freitag Jr. et al. | 198/831 |

Primary Examiner—Robert B. Reeves
Assistant Examiner—Brain Bond
Attorney, Agent, or Firm—Bell, Seltzer, Park & Gibson

[57] ABSTRACT

A curved belt conveyor having a generally planar ring shaped belt supported and guided for movement along a closed path of travel having first and second generally parallel, spaced apart runs with an inner peripheral edge of the belt substantially defining an arc of the circle about a predetermined center. In accordance with the present invention, the inner peripheral edge of the belt is engaged by a plurality of guide rollers, each of which is mounted for individual independent movement radially of the arc described by the inner peripheral edge. The rollers are resiliently biased radially outwardly against the edge of the belt.

5 Claims, 6 Drawing Figures

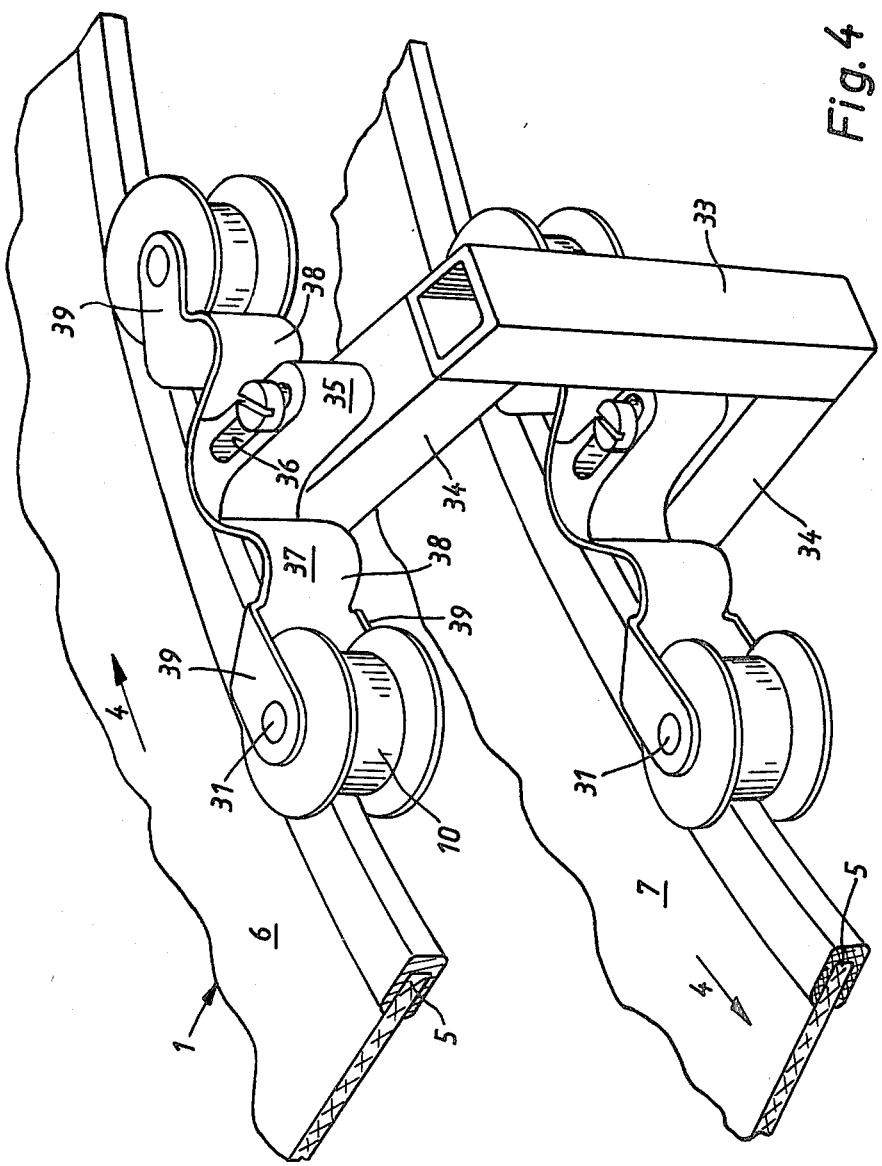

CURVED BELT CONVEYOR

It has been known heretofore to provide curved belt conveyors in which a generally planar, ring shaped belt moves along paths substantially defining arcs of a circle about a predetermined center, in a manner similar to a path configuration necessary to turn through some predetermined angle such as a right angle in a conveyor line. Such curved belt conveyors have been recognized heretofore as giving rise to radial forces tending to displace the inner peripheral edge of the belt toward the center about which the closed path of travel of the belt extends. It has been recognized that such radial forces must be accommodated in some suitable manner, and solutions proposed heretofore have included engaging the inner peripheral edge of the belt with a guide means adapted to the arc or curve through which the conveyor belt moves. Generally, conveyor belts engaged by such an inner guide for taking up radially directed forces are reinforced in the radial or transverse direction, for example by embedment of radial reinforcing members.

As will be appreciated, radial forces acting between an inner peripheral edge of a curved belt conveyor and the side guide may result in heavy stressing of the inner peripheral edge of the belt and consequent wear. While one approach to dealing with such wear is to provide reinforcement for the edge portion of the belt, it is nonetheless recognized that non-uniform distribution of the radial forces along the lateral or side edge guide means will lead to stress concentration and resultant higher wear.

Attempts have been made heretofore to overcome such concentration of stresses by providing lateral or peripheral edge guides in the form of a plurality of guide rolls, rotatably supported in pairs at the ends of rocking arms, each of which is adapted to pivot or swing about a center intermediate the two rolls. While this arrangement accomplishes a certain adaptation of the guide rolls of a lateral guide means to the instantaneous geometry of a curved belt conveyor subjected to varying radial forces, the degree of accommodation is limited because radial displacement of one guide roll of necessity causes an opposed radial displacement of the other guide roll supported on the sames rocking arm. Such characteristics of a lateral guide arrangement also require precise adjustment of the pairs of guide rolls with respect to the path of travel of the conveyor belt. However, as the conveyor belt gradually changes in dimensions during use, primarily with respect to length due to a natural extension resulting from the bias construction of the belt, aging and loading factors, the position of the pairs of guide rolls requires constant attention during operation of the conveyor.

Somewhat improved adaptability to the characteristics of a curved belt conveyor has been accomplished by alternative arrangements in which the rocking arms on which guide rolls are mounted are interconnected one to another, somewhat in the form of a "Christmas tree". Notwithstanding such pyramiding interconnection of mounting arms, uncontrollably high radial force loading occurs, leading to excessive wear of the inner peripheral edge of the belt.

With the aforementioned difficulties and deficiencies of prior arrangements particularly in mind, it is an object of this invention to provide, in a curved belt conveyor arrangement of the type generally described above, an improvement whereby concentrated loading of an inner peripheral edge of a curved belt is avoided. In realizing this object of the present invention, a plurality of guide rollers are provided for engaging the inner peripheral edge of a curved belt, with the rollers being mounted for individual independent movement radially of the arc described by the inner peripheral edge. As a result, movement necessary for accommodation of otherwise concentrated stresses occurs with each roller moving independently of the movement of any other of the rollers.

Yet a further object of the present invention is to facilitate reduction of stress concentration in an inner peripheral edge of a curved belt conveyor by accommodating a desired profile of biasing forces resisting radially inwardly directed forces transmitted from the belt. In realizing this object of the present invention, each of a plurality of independently movable rollers engaging an inner peripheral edge of a belt is resiliently biased radially outwardly against the edge of the belt, with the biasing forces exerted against and by the rollers being profiled in a desired manner. In a particular form of the invention, the bias forces imposed on successive rollers increases in the direction of movement of the belt.

Some of the objects of the invention having been stated, other objects will appear as the description proceeds, when taken in connection with the accompanying drawings, in which FIG. 1 is a somewhat schematic isometric view of a curved belt conveyor in accordance with the present invention;

FIG. 4 is a view similar to FIGS. 2 and 3, illustrating another mounting arrangement;

While the present invention will be described more particularly hereinafter with reference to the accompanying drawings, it is to be understood at the outset of the description which follows that it is contemplated that persons skilled in the appropriate mechanical arts will be able to modify the structures shown and to be described while still attaining the desired result of this invention. Accordingly, the description which follows is to be understood broadly as a general teaching directed to persons skilled in the appropriate mechanical arts, and not as limiting upon the scope of this invention.

Figure 1:
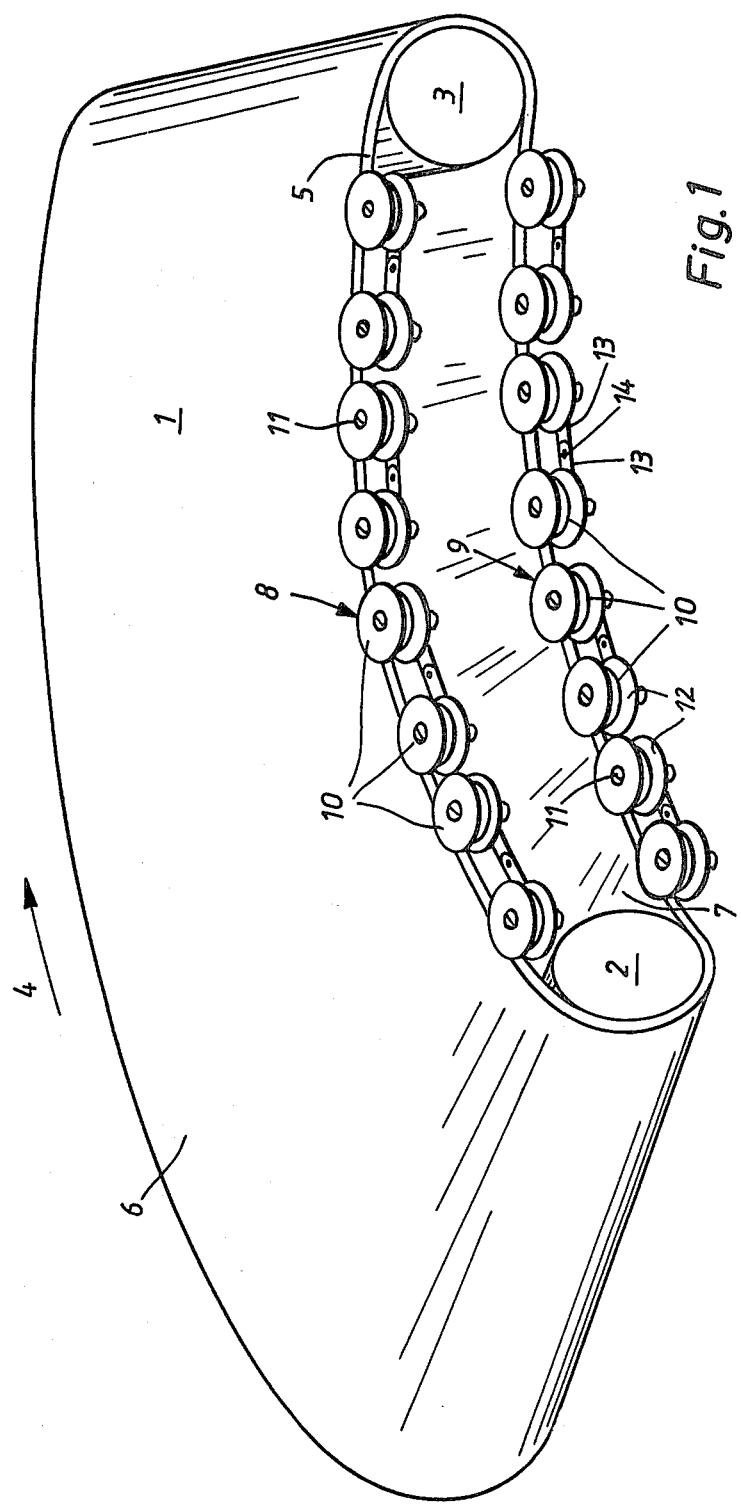
Figure 2:
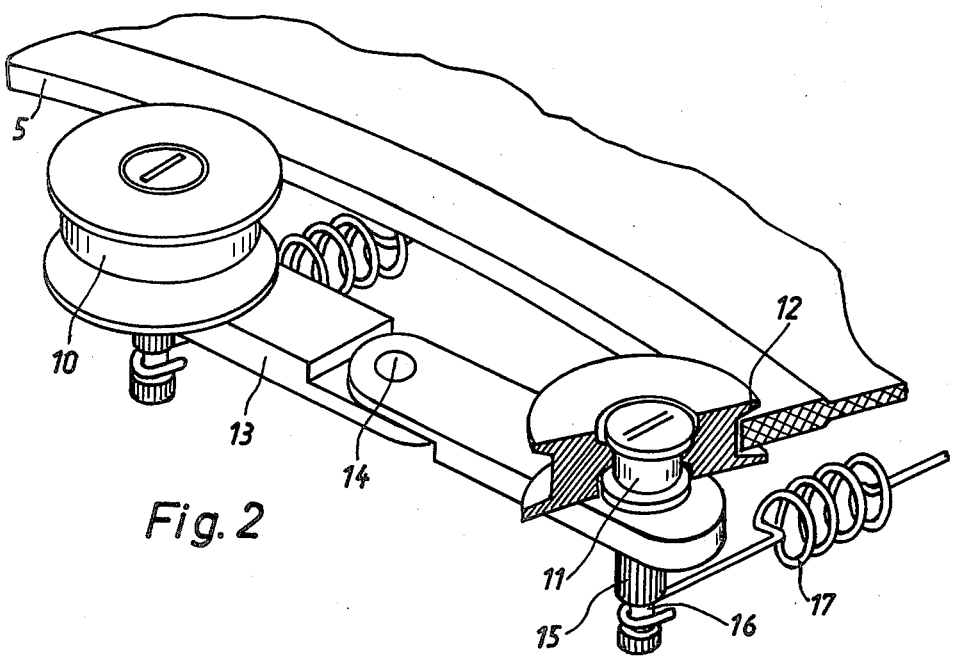
FIG. 2 is a somewhat schematic isometric view of two guide rolls and an arrangement for mounting the rolls as used in the curved belt conveyor in FIG. 1.

Referring now more particularly to FIG. 1, the curved belt conveyor as there shown has an endless, generally planar, ring shaped belt 1 of known design. Means are provided for supporting the belt 1 and for guiding the belt along a closed path of travel having first and second generally parallel, spaced apart runs with an inner peripheral edge 5 of the belt 1 substantially defining or describing an arc of a circle or a curve about a predetermined center. The means for supporting and for guiding the belt may include a pair of conical return rolls 2, 3 mounted for rotation about respective axis. The axes of rotation of the two rolls 2, 3 are disposed in a common plane and extend at a certain angle with respect to one another in accordance with the curve of the path through which the conveyor belt 1 is to move. Inner ends of the rolls 2, 3 are visible in FIG. 1 and are located at the smaller radius. One of the rolls (illustrated as the right roll 3 as seen in FIG. 1) is driven and moves the conveyor belt 1 in a direction of movement indicated by the arrow 4. The conveyor belt 1 is reinforced transversely by radially extending bars (not shown) which are embedded in the belt. The inner edge 5, which is the interior and shorter longitudinal edge of the generally planar, ring shaped belt 1, is provided with a thickened configuration of particularly wear resistant and abrasion proof rubber (FIGS. 2 and following).

Lateral guide means generally indicated at 8 and 9 cooperate with the inner peripheral edge 5 of the belt 1 along both the first and second generally parallel, spaced apart runs, namely an upper run 6 and a lower run 7. The lateral guide means 8, 9 serve to accommodate or take-up inwardly directed radial forces acting on the conveyor belt. That is, the lateral guide means 8, 9 support the belt 1 with respect to such radial forces. Each of the lateral guide means 8, 9 extends across substantially the entire distance between the two return rolls 2, 3 and the lateral guide means are of identical design. Each lateral guide means comprises a series of roller means in the form of identical flanged edge guide rolls 10 mounted for rotation about axes at right angles to the plane of the conveyor belt and arranged at spaced apart locations along the inner peripheral edge 5 of the belt 1 in positions normally defining or describing an arc of a circle or a curve about the predetermined center.

In a curved conveyor in accordance with the present invention, the means provided for mounting the roller means adjacent the arc defined by the inner peripheral edge of the belt additionally provides for individual independent movement of the roller means radially of the arc. Thus, in contrast with the previously known curved belt conveyors, there is no coupling of movement between or among the individual edge guide rolls. Further, means are provided which are operatively connected with the mounting means and roller means for resiliently biasing each of the edge guide rolls radially outwardly against the edge of the belt. Such a resilient biasing of the individual guide rolls makes it possible for each roll to adjust automatically to changes in the instantaneous geometry of the conveyor belt and thus achieve optimum adaptation to the radial forces, in the sense that the radial forces are always distributed substantially evenly among several edge guide rolls. In other words, the individual rolls may give way under the influence of locally increased radial forces until adjacent edge guide rolls take a greater share in the support. Undue contact pressure with the conveyor belt inner peripheral edge and inadmissably strong bending of the inner edge resulting from such contact pressure thus are effectively avoided. The arrangement of the present invention thus accomplishes an extended operating life for a curved belt conveyor.

A further advantage of the improvement of the present invention lies in a self-centering characteristic of the curved belt conveyor. Correct selection of the resilient biasing forces acting on the roller means causes the conveyor belt to always be held substantially automatically in a certain part-circular path, at an equilibrium between the resilient biasing forces exerted on the edge guide rolls and the radial forces originating from longitudinal tensioning of the curved belt. This occurs even if the dimensions, and in particular the length, of the conveyor belt change during its operational life. Thus, considerable maintenance and adjustment is avoided.

It has been discovered that the self-centering characteristic of a curved belt conveyor in accordance with the present invention is enhanced where the means for resiliently biasing the roller means imposes on successive roller means biasing forces which increase in the direction of movement of the belt. Such an arrangement accommodates the observed fact that the radial forces arising in a conveyor belt during operation will rise progressively in the direction of movement toward the driven return roll 3. While such enhanced operation has been achieved by the combination of this invention, it has also been found that a relatively coarse ajustment of the bias forces is quite sufficient. For example, all guide rolls 10 of the conveying or upper or first run 8 which engage the inner peripheral edge of the belt in a first half of the conveying distance may have a common bias force applied thereto, with all guide rolls in the second half of the conveying distance having a higher bias force which again is the same for all of them. It has been discovered that curved belt conveyors carrying medium loads and of medium size will be self-centering where the resilient bias forces are in a range of from about 5 kip to about 10 kip (from about 49 Newtons to about 98 Newtons). In such an arrangement, bias forces selected for the first half of a conveying distance may, for example, be 5 kip (49 Newton), while biasing forces for the second half may be 7 kip (68 Newton).

As used herein, the terms "resiliently biasing" are to be understood very broadly. It is contemplated that resilient biasing may be accomplished not only by normal mechanical or metallic springs such as leaf springs, spiral springs, helical springs, and the like but also by means of hydraulic, pneumatic, elastomeric and other means including working cylinders and the like. In the interest of obtaining a simple structure, mechanical springs are preferred.

In the arrangement particularly illustrated in FIGS. 1 and 2, the means for resiliently biasing the rollers 10 comprises a plurality of pivoting lever means 13. Each of the lever means 13 takes the form of a straight, one-arm swinging lever carrying an axle or pin 11 for rotatably supporting a corresponding one edge guide roll 10. Adjacent pairs of levers 13 mounting guide rolls 10 each have a common swivel pin 14 fixed stationarily at a predetermined location between the two guide rolls 10 approximately on a line extending therebetween. By such an arrangement, each guide roll 10 is adapted to be displaced individually and radially back and forth transversely of the axis of rotation by swinging movement of its respective lever 13, regardless of the position of any other guide roll. This displacement is effectively in a radial direction of the curve or arc through which the conveyor belt moves.

Preferably, each axle or pin 11 about which a guide roll 10 rotates has an extension 15 extending downwardly through the respective pivoting lever means 13 and provided near its end with an annular groove 16. A helical spring 17 is clamped in the annular groove 16 and biased in a radial direction between the extension and a stationary support (not shown) below the corresponding run of the conveyor belt 1 so as to pull the associated guide roll 10 with a certain resilient biasing force in a direction radially outwardly against the edge of the belt.

The helical springs 17 which cooperate with the roller means 10 on the upper run 6 of the conveyor belt 1 are dimensioned differently so that, in normal position, the guide rolls 10 of the first half of the conveying distance between the return member 2 and approximately the mid point of the arc or curved path followed by the belt 1 are each biased with the force of approximately 5 kip (49 Newton), while the guide rolls in the second half of the conveyor are each biased at a resilience of approximately 7 kip (68 Newton). The guide rolls for the second or lower run 7 are biased uniformly at a biasing force of approximately 5 kip (49 Newton). A balance of forces is thus established between the radial forces tending to pull the conveyor belt inwardly and the biased edge guide rolls 10, causing the belt to be automatically held in a part-circular path and the radial forces to be taken up to be distributed substantially evenly among the rolls.

Figure 3:
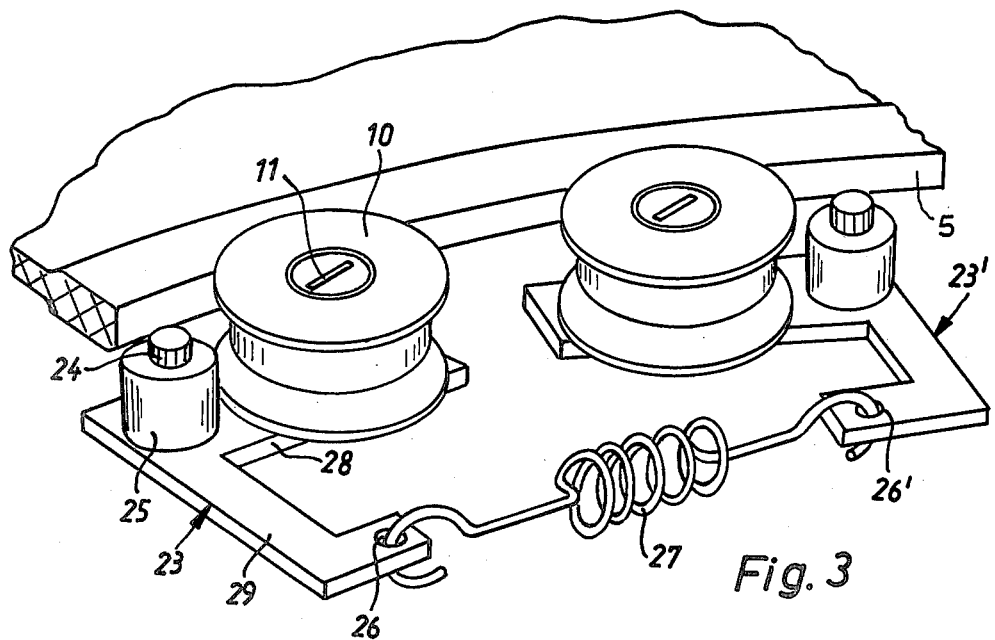
FIG. 3 is a view similar to FIG. 2, illustrating an alternate form of a mounting arrangement for guide rolls.

A modified form of mounting means for the edge guide rolls 10 is shown in FIG. 3, where an angular or bell-crank two arm swinging lever 3 is mounted for pivoting movement around a stationary pivot pin or axle 24 by means of a bushing 25. In normal position, one arm 28 of the pivoting lever means 23 extends approximately parallel to the inner edge 5 of the conveyor belt 1. At a terminal end, the one arm 28 carries an axle 11 of an associated guide roll 10. The other arm 29 of the pivoting lever means extends radially inwardly in the direction toward the center of curvature, and approximately at right angles to the one arm 28. At its free end, the radially extending other arm is provided with a hole 26 in which one end of a helical spring 27 is hooked. The other end of the helical spring 27 is hooked in the corresponding hole 26' in an adjacent pivoting lever means 23' mounting an adjacent guide roll 10. The pivoting lever means 23' is designed and arranged in mirror symmetry with respect to the adjacent pivoting lever 23, such that the helical spring 27 which is tensioned between the two pivoting levers presses the two guide rolls 10 carried by the swinging levers against the inner edge 5 of the conveyor belt 1.

Another arrangement of means mounting guide rolls is shown in FIG. 4, where four edge guide rolls, two for the upper run and two for the lower run, are mounted in common by a U-shaped stationary bracket 33. Two legs 34 of the bracket 33 extend in radial directions up to positions adjacent the inner edge 5 of the conveyor belt 1, in planes somewhat displaced from the planes defined by the runs of the belt. A clamping piece 35 is fastened by an appropriate threaded connection to each leg 34, and has an oblong mounting hole 36 which permits adjustment of the clamping piece 35 in a radial direction.

Each clamping piece 35 mounts a metallic leaf spring 37 which has a curved configuration with principal planes lying substantially perpendicular to the plane of the conveyor belt 1. Each leaf spring 37 has two arms 38 which are similar in mirror symmetry and extend adjacent the inner peripheral edge 5 of the belt 1. Each arm 38 has lugs 39 at the free end thereof bent at right angles and retaining a pivot pin 31 about which respective edge guide rolls 10 are mounted for rotation. The edge guide rolls 10 are pressed against the inner peripheral edge 5 of the conveyor belt 1 by the biasing effect of the leaf springs 37 and their respective arms 38, with the biasing force being adjusted by corresponding adjustment of the position of the clamping piece 35.

Figure 5:
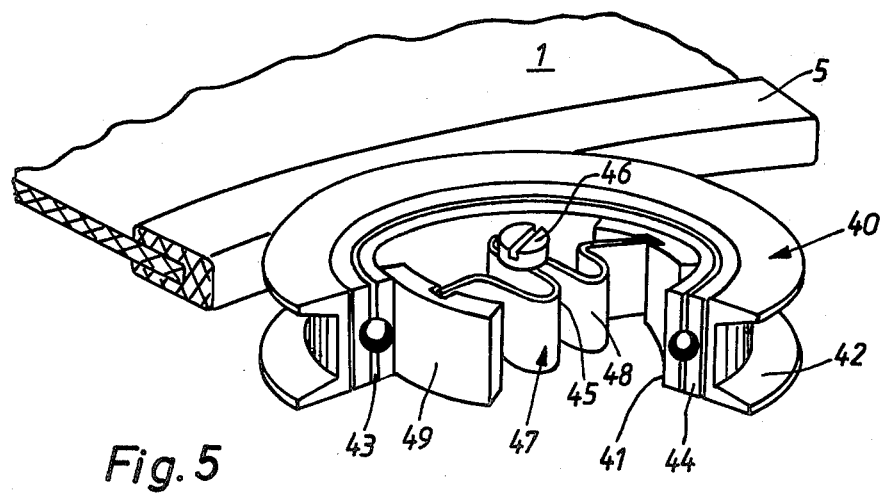
FIGS. 5 and 6 are partly schematic, partly broken away isometric views somewhat similar to FIGS. 2–4 and showing a mounting means integrated with a roller.
Figure 6:
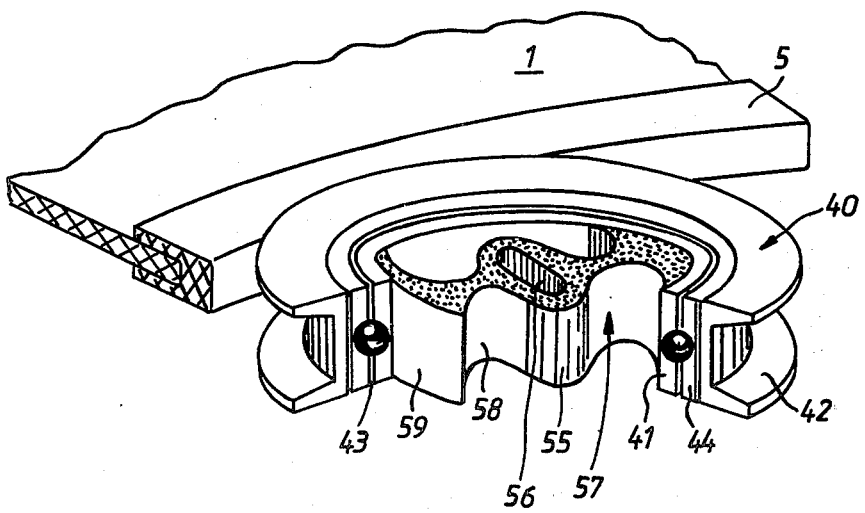

The integration of a mounting means and a resilient biasing means is illustrated in two forms in FIGS. 5 and 6. In FIG. 5, a guide roll 40 is supported for rotation on a race 41 which constitutes the inner ring or race of an anti-friction bearing such as a ball bearing 43. A flanged ring 42 is secured against rotation on the outer race or ring 44 of the ball bearing 43 and, together with the outer ring 44, forms the edge guide roll proper.

Within the race 41 is a metallic leaf spring 47, having a principal plane which is oriented in a perpendicular direction with respect to the plane of the conveyor belt and which is undulated or curved transversely of its plane, as is the case with the metallic leaf spring 37 of the embodiment of FIG. 4. A central section 45 of the leaf spring 47 is bent into a U-shape to form a slot which receives a mounting bolt 46 for clamping the leaf spring 47 to a stationary mounting assembly (not shown). At either side of the central section 45, the leaf spring 47 has arms 48 which are similar in mirror symmetry and which are each provided at their free ends with a connecting piece 49. The connecting pieces 49 abut against the inside of the inner race 41 and are fixed relative to the inner race. The arms 48 of the leaf spring 47 extend approximately parallel to the inner peripheral edge 5 of the conveyor belt 1, and as so arranged, the slot formed by the central section 45 extends approximately in a radial direction. Thus, the resilient biasing force imposed by the leaf spring 47 and pressing the guide roll 40 against the conveyor belt 1 can be adjusted by displacing the spring along the slot with respect to the mounting bolt 46.

A shaped elastomeric material member 57 is employed in the mounting arrangement of FIG. 6 to take the place of the metallic leaf spring 47. The elastomeric or rubber material member 57 has a central clamping section 55 which is reinforced in the axial direction of the guide roll and has a radially oriented oblong mounting hole 56 to receive a mounting bolt. At either side of the clamping section 55, the elastomeric member has a waist-like spring section 58. At their ends, the spring sections 58 are enlarged to form connecting sections 59. Each connecting section 59 is cemented at a front end face to the inner surface of the race 41. Because of its configuration, such a shaped elastomeric material member will yield relatively little in the axial direction of the guide roll 40, or transversely of the plane of the conveyor belt. However, lateral deformation of the waist-like spring sections 58 permits displacement of the guide roll 40 in a radial direction relative to the curved belt there.

The guide rolls described hereinabove with particular reference to FIGS. 5 and 6 may be mounted in a manner generally similar to the arrangement suggested in FIG. 4.

In the drawings and specification, there has been set forth a preferred embodiment of the invention, and although specific terms are employed, they are used in a generic and descriptive sense only and not for purposes of limitation.

That which is claimed is:

1. In a curved conveyor having a generally planar ring shaped belt, and means for supporting the belt and for guiding the belt along a closed path of travel having first and second generally parallel, spaced apart runs with an inner peripheral edge of the belt substantially defining an arc of a circle about a predetermined center, the improvement in said supporting and guiding means comprising a plurality of guide roller means for engaging said inner peripheral edge of said belt, means mounting said roller means adjacent said arc and for individual independent movement radially of said arc, and means operatively connected with said mounting means and said roller means for resiliently biasing each of said roller means radially outwardly against said edge of said belt, said means for resiliently biasing said roller means comprising a plurality of leaf spring means, each said leaf spring means having spaced end portions for rotatably supporting an adjacent pair of said roller means, and means for stationarily supporting each of said leaf spring means at points thereof intermediate said end portions.

2. In a curved conveyor having a generally planar ring shaped belt, and means for supporting the belt and for guiding the belt along a closed path of travel having first and second generally parallel, spaced apart runs with an inner peripheral edge of the belt substantially defining an arc of a circle about a predetermined center, the improvement in said supporting and guiding means comprising a plurality of guide roller means for engaging said inner peripheral edge of said belt, means mounting said roller means adjacent said arc and for individual independent movement radially of said arc, and means operatively connected with said mounting means and said roller means for resiliently biasing each of said roller means radially outwardly against said edge of said belt, said means for resiliently biasing said roller means comprising a plurality of race means, corresponding in number to the number of said roller means, each said race means rotatably supporting a corresponding one roller means, and a plurality of spring means corresponding in number to the number of said race means, each said spring means being disposed within a corresponding one race means.

3. A conveyor according to claim 2 wherein each said spring means comprises a metallic leaf spring member.

4. A conveyor according to claim 2 wherein each said spring means comprises a shaped elastomeric material member.

5. A conveyor according to one of claims 2, 3 and 4 wherein each said race means comprises an inner race of an anti-friction bearing means.

* * * * *